Patented Dec. 19, 1933

1,940,574

UNITED STATES PATENT OFFICE 1,940,574

WELDING ROD

John B. Austin, Cleveland Heights, Ohio, assignor to Una Welding, Inc., Cleveland, Ohio, a corporation of Delaware No Drawing. Application May 21, 1931, Serial No. 539,129. Renewed May 25, 1932

10 Claims. (Cl. 219—8)

This invention relates to welding, and more particularly to welding rods especially adapted for use in integrally uniting non-ferrous to ferrous metal.

This application is a continuation in part of my copending application Serial No. 217,307 filed September 2, 1927.

Welding copper to steel by the use of non-ferrous welding rods or electrodes is ordinarily accomplished by one of two methods, namely, gas welding, in which a gas flame is employed as a source of heat, or electric arc welding. Electric arc welding may be accomplished by the carbon arc process in which a carbon electrode is employed, or the metal arc process wherein the arc is drawn from the welding rod or electrode.

The characteristics required of a non-ferrous, such as copper, welding rod to be used in gas welding are ordinarily quite different from those required of a welding rod to be used in electric arc welding. Thus in welding copper to steel by the gas process, the welding rod preferably has the property of "tinning", or brazing to, a cleaned steel surface. Moreover, the welding rod metal when molten is preferably somewhat pasty and plastic in character in order that a copper casting may be gradually formed.

In welding copper to steel by the electric arc process, however, the welding rod preferably has deoxidizing characteristics in order to counteract the oxidizing character of the arc and to dissolve oxides from an uncleaned, scale-coated surface of the steel, whereby the molten weld metal may readily unite integrally with the steel by a strong and non-porous junction. The metal of the rod moreover preferably melts smoothly and uniformly under the action of the arc. For use in the metal arc process, the welding rod should be constituted to provide a non-flickering and stable arc and to transfer molten weld metal through the arc without sputtering of said molten metal. Moreover, in cast welding copper to steel by the electric arc process, where an end of the copper article to be welded to steel extends into a mold positioned against the steel, and metal from the welding rod is melted into the mold, the molten weld metal should be quite fluid in character in order to satisfactorily fill the mold and to permit the removal of any slag from adjacent the steel.

Due to the diverse requirements for welding rods to be used in gas, and in arc welding, as illustrated above, it has been customary in the past to employ welding rods specially prepared for the process by which the welding was to be carried out. Thus, for example, the term "gas welding rods" has come to have a distinct meaning in welding practice as referring to welding rods specially prepared for use in gas (oxy-acetylene) welding. The expense involved by the necessity heretofore for the welder to keep on hand separate stocks of non-ferrous welding rods for the various processes of copper welding, will be obvious.

An object of this invention is to provide a welding rod or electrode having advantageous welding characteristics.

Another object of the invention is to provide a coated copper welding rod of superior welding properties.

A further object of my invention is to provide a copper welding rod having associated therewith advantageous deoxidizing and modifying constituents.

Another object of the invention is to provide a non-ferrous welding rod or electrode having associated therewith materials to render said welding rod suitable for either electric arc or gas welding.

A further object of my invention is to provide a copper welding rod particularly suited for integral union to ferrous metal, as in welding copper to steel.

Another object of the invention is to provide a welding rod by means of which a copper to steel joint of great permanence and low resistance may be formed.

Another object of this invention is to provide a copper welding rod having suitable materials associated therewith to improve the characteristics of welding rod metal when in the molten state.

A further object of the invention is to provide a copper welding rod having suitable materials associated therewith whereby to obtain weld metal of superior physical characteristics.

Another object of the invention is to provide a copper welding rod having improved flowing properties.

A further object of the invention is to provide a relatively inexpensive copper welding rod arranged to produce weld metal of high quality.

Another object of this invention is to provide a welding rod by means of which a strong substantially non-porous copper to steel welded junction may be formed.

A further object of my invention is to provide an improved method of integrally uniting copper to ferrous metal to form a strong non-porous welded junction of superior characteristics between ferrous metal and copper weld metal.

Other objects of the invention will be apparent to those skilled in the art from the description of it hereinafter given.

I have developed a non-ferrous welding rod which is adapted for use with either gas or electric arc welding. I have moreover developed a welding rod particularly suited for use in welding copper to steel. According to my invention, I preferably associate with a copper rod deoxidizing material and material having good "tinning" properties. In addition, I may associate with the welding rod suitable material to provide a weld casting of improved strength. Any or all of the deoxidizing, tinning and strengthening materials may be associated with the welding rod in the form of alloys or as a coating. I frequently prefer to dispose certain of the above mentioned materials on the electrode as a coating, employing a suitable binder, in order to confer additional desirable arc welding characteristics upon the welding rod.

Deoxidizing material is particularly advantageous in the cast welding of copper in molds for the reason that the cast welding operation is a rapid one and the deoxidizing material serves to rapidly remove oxides and gases from the molten bath and from the surface of ferrous metal to which the copper is to be integrally united without substantially melting the latter. Among the deoxidizing materials which I have found suitable for this purpose are silicon, manganese, aluminum and others.

"Tinning" materials are those which have the peculiar property of brazing to a metal surface, such as a piece of steel, at a suitable temperature. Deoxidizing material associated with the tinning material according to my invention apparently does not appreciably affect the tinning properties of said material. This tinning phenomenon is probably a solid solution of the tinning material with the metal to be brazed, for example, a piece of steel. When a surface of a piece of steel has been tinned, it is relatively easy to cause a built-up copper casting to unite to the tinned surface and therefore to steel. Tin has been found a very suitable material to produce this tinning effect. Boron is another material suitable for obtaining the tinning effect in the gas welding process.

As has been previously mentioned, the various above mentioned elements may be associated with the rod in the form of alloys or in the form of a coating on the copper rod. When the materials or any of them are disposed on the rod as a coating, a suitable binder is employed to secure them thereto, the binder preferably being one which will not interfere with the arc welding characteristics of the rod and preferably one which will enhance such characteristics. Silicate of soda in the proportion of one part by volume of commercial silicate to two parts by volume of water has been found to be a very satisfactory binder. Lacquers have also been found suitable for this purpose. Shellac and various other binders may also be used.

The copper to be employed as a welding rod is preferably relatively pure and free from slag, oxides or other impurities. The elements to be associated with the copper rod may, of course, be present in the rod in alloyed form. Frequently, however, it is convenient to dispose the elements to be associated with the copper on the rod in the form of a coating. Various materials may be used in the elemental state or as alloys. For example, silicon may be employed in the elemental state or in the form of an alloy, such as silicon-copper containing about 10 percent silicon.

Manganese may be employed in the form of a pure metal or as a commercial alloy, such as manganese-copper, or manganese-boron containing for example about 75 percent manganese. The tin may be used in the form of a pure metal or any suitable alloy. Boron may be conveniently employed in the form of boron-copper, boron-manganese containing about 15 percent boron, or other suitable alloy. The various metals and alloys mentioned above are preferably ground to relatively finely divided state before being disposed on the copper rod in order that the coating may be as thin as possible and in order that the various metals may be uniformly distributed over the rod.

The coating materials may be maintained in cooperative relation to the metal rod by any suitable binding material, such as, for example, as previously mentioned, an aqueous solution of silicate of soda. The coating materials may be applied to a copper rod in any suitable manner such as by dipping said rod in a suspension of materials or by painting said materials on the rod. The constituents may, of course, be applied to the rod in one or more coatings and, if desired, successive coatings may each contain certain of the coating constituents. One convenient method of applying the coating constituents to the rod is to form a suspension comprising all the materials and the binder, and to dip said rods in the suspension, forming the desired thickness of coating in one dipping operation.

As a specific example of one manner in which my invention may be carried out, a substantially pure copper rod of approximately $\frac{1}{16}$ inch diameter was employed. The coating constituents comprised the following:

| Material | Composition | Mesh | Parts by weight |
|---|---|---|---|
| Manganese-boron | 15% boron<br>75% manganese | 200 | 3.0 |
| Tin | 90% tin<br>10% zinc | 300 | .5 |
| Silicon-copper | 10% silicon | 200 | 1.0 |
| Pure copper | 100% copper | 300 | 0.6 |

With the above solid coating constituents was mixed 2½ parts by weight of a silicate binder comprising one part by volume of commercial silicate of soda and two parts by volume of water. The above-mentioned rod was dipped in the above composition to form a coating 0.0055 inch thick. The welding rod formed as above, which contained about 0.6 percent manganese, 0.1 percent boron, 0.1 percent tin, and 0.025 percent silicon, proved to be exceedingly satisfactory for both the arc welding and gas welding processes. Moreover, the weld castings formed with the above welding rod were especially strong from the mechanical standpoint as well as being relatively low in electrical resistance, whereas the metals or alloys ordinarily used for gas welding copper frequently increase the resistance of the completed casting and weld considerably, thereby sacrificing electrical efficiency.

It might be mentioned that the use of the various constituents in the form of a coating is particularly advantageous in welding by the electric arc process since the coating provides improved arc welding characteristics and greater arc stability. The ease with which the welding process may be carried out is increased particularly where only relatively low arc welding currents are available. The constituents in the form of a coating also tend to prevent sputtering of the molten copper during the welding operation, thereby rendering the molten metal more easily controlled.

In general, it may be stated that silicon may be present in associated form with the rod to the extent of 0.02 to 0.5 percent by weight of the rod; tin 0.05 to 1.5 percent by weight of the rod; manganese 0.05 to 1.5 percent; boron 0.05 to 0.5 percent. It will be understood, of course, that to suit particular circumstances, one or more of the above mentioned elements may be omitted, in which case the remaining constituents are suitably proportioned accordingly. The deoxidizing material is preferably present in amount from 0.02 to 2. percent, and the tinning material in amount from 0.05 to 2. percent.

It will thus be seen that I have provided a welding rod having advantageous arc welding characteristics and advantageous gas welding characteristics whereby the rod may be equally readily employed, for example, in welding copper to steel with either the electric arc or gas welding processes.

It will furthermore be noted that I have provided a welding rod having desirable welding characteristics and having associated therewith material suited to provide weld castings of exceptional strength and relatively low electrical resistance.

It will also be noted that I have provided a welding rod which may be produced very economically, particularly when the various constituents are associated with a pure copper rod in the form of a coating.

To those skilled in the art many modifications of and widely differing embodiments and applications of my invention will suggest themselves, without departing from the spirit and scope thereof. My disclosures and the descriptions herein are purely illustrative and are not intended to be in any sense limiting.

What I claim is:

1. A welding rod for use with either the electric arc or gas welding process, said welding rod consisting predominantly of copper and having associated therewith deoxidizing material of a group comprising silicon and manganese in amount from 0.02 to 2. percent, and tinning material of a group comprising tin and boron in amount from 0.05 to 2. percent.

2. A welding rod consisting predominantly of copper and having associated therewith manganese in amount from 0.05 to 1.5 percent, boron from 0.05 to 0.5 percent, tin from 0.05 to 1.5 percent, and silicon from 0.02 to 0.5 percent.

3. A coated welding rod for use with either the electric arc or gas welding process, said welding rod comprising a base rod consisting predominantly of copper and a coating secured to said base rod, said coating including manganese-boron alloy, said coating comprising manganese in amount from 0.05 to 1.5 percent, boron in amount from 0.05 to 0.5 percent, tin in amount from 0.05 to 1.5 percent, and silicon from 0.02 to 0.5 percent, all with respect to the weight of the rod.

4. A welding rod consisting predominantly of copper and having associated therewith manganese in amount about 0.6 percent, boron about 0.1 percent, tin about 0.1 percent and silicon about 0.025 percent.

5. A welding electrode comprising a base rod composed predominantly of copper and having a deoxidizing material and a brazing or tinning material associated therewith, the deoxidizing material being present in amounts ranging from .02% to 2% of the weight of the electrode, and the tinning or brazing material being present in amounts from .05% to 2% by weight of said electrode.

6. A welding electrode comprising a base rod composed predominantly of copper and coating material associated with said rod, said coating material containing from .02% to 2% of a deoxidizing material with respect to the weight of the rod, and from .05% to 2% with respect to the weight of the rod by weight of an ingredient having tinning or brazing properties.

7. A welding electrode comprising a base rod composed predominantly of copper and a coating material associated with said rod, said coating material comprising one or more metals selected from a group of deoxidizers consisting of silicon, manganese and aluminum in amounts ranging from .02% to 2% of the weight of the rod, and one or more metals selected from a group of tinning or brazing metals consisting of tin and boron in amounts ranging from .05% to 2% of the weight of the rod.

8. A welding electrode comprising a base rod composed predominantly of copper and a coating material associated with said rod, said coating material comprising one or more metals selected from a group of deoxidizers consisting of silicon, manganese and aluminum in amounts ranging from .02% to 2% of the weight of the rod, and one or more metals selected from a group of tinning or brazing metals consisting of tin and boron in amounts ranging from .05% to 2% of the weight of the rod, said coating material being secured to the rod by means of a binder.

9. A welding electrode comprising a base rod composed predominantly of copper and a coating material associated with said rod, said coating material comprising one or more metals selected from a group of deoxidizers consisting of silicon, manganese and aluminum in an amount ranging from .02% to 2% of the weight of the rod, and one or more metals selected from a group consisting of tin and boron in an amount ranging from .05% to 2% of the weight of the rod, the selected metals being in finely divided form and uniformly distributed over the rod in the form of a relatively thin coating.

10. A welding electrode comprising a base rod composed predominantly of copper and a coating material associated with said rod comprising one or more deoxidizers in amounts ranging from .02% to 2% of the weight of the rod, and one or more tinning or brazing materials in amounts ranging from .05% to 2% of the weight of the rod, said coating being uniformly distributed over the rod in the form of a relatively thin coating and being free from ingredients which substantially increase the electrical resistance of the weld metal.

JOHN B. AUSTIN.